(12) United States Patent
Bowman et al.

(10) Patent No.: US 11,271,910 B2
(45) Date of Patent: *Mar. 8, 2022

(54) TECHNIQUES FOR SHARED PRIVATE DATA OBJECTS IN A TRUSTED EXECUTION ENVIRONMENT

(71) Applicant: INTEL CORPORATION, Santa Clara, CA (US)

(72) Inventors: Mic Bowman, Beaverton, OR (US); Andrea Miele, Hillsboro, OR (US); James P. Held, Portland, OR (US); Anand Rajan, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 136 days.

This patent is subject to a terminal disclaimer.

(21) Appl. No.: 16/723,564

(22) Filed: Dec. 20, 2019

(65) Prior Publication Data

US 2020/0244628 A1 Jul. 30, 2020

Related U.S. Application Data

(63) Continuation of application No. 15/721,723, filed on Sep. 29, 2017, now Pat. No. 10,554,634.

(60) Provisional application No. 62/547,734, filed on Aug. 18, 2017.

(51) Int. Cl.
| | |
|---|---|
| *H04L 29/06* | (2006.01) |
| *H04L 9/32* | (2006.01) |
| *G06F 21/57* | (2013.01) |
| *H04L 9/08* | (2006.01) |
| *G06F 21/62* | (2013.01) |

(52) U.S. Cl.
CPC .......... *H04L 63/0428* (2013.01); *G06F 21/57* (2013.01); *G06F 21/6218* (2013.01); *H04L 9/0822* (2013.01); *H04L 9/3234* (2013.01); *H04L 9/3236* (2013.01); *H04L 63/123* (2013.01); *H04L 2209/38* (2013.01)

(58) Field of Classification Search
CPC . H04L 63/0428; H04L 63/123; H04L 9/0822; H04L 9/3234; H04L 9/3236; H04L 2209/38; G06F 21/57; G06F 21/6218
USPC .......................................................... 713/153
See application file for complete search history.

(56) References Cited

U.S. PATENT DOCUMENTS

| | | | | |
|---|---|---|---|---|
| 2017/0352027 | A1* | 12/2017 | Zhang | G06Q 20/065 |
| 2017/0353309 | A1* | 12/2017 | Gray | H04L 9/3239 |
| 2018/0060496 | A1* | 3/2018 | Bulleit | H04L 9/3239 |
| 2018/0309567 | A1* | 10/2018 | Wooden | G06F 21/6209 |
| 2018/0330077 | A1* | 11/2018 | Gray | H04L 9/3297 |
| 2018/0330078 | A1* | 11/2018 | Gray | H04L 9/3268 |

(Continued)

*Primary Examiner* — Michael S McNally
(74) *Attorney, Agent, or Firm* — Kacvinsky Daisak Bluni PLLC

(57) ABSTRACT

Techniques for sharing private data objects in a trusted execution environment using a distributed ledger are described. The techniques described herein may enable sharing of data objects, referred to herein as private data objects (PDOs), between individuals and organizations with access and update policies mediated by execution of code (referred to herein as a "smart contract") carried with the PDO in a secure enclave. A distributed ledger may serve as a "public commit log" to ensure that there is a single, authoritative instance of the object and provide a means of guaranteeing atomicity of updates across interacting objects.

24 Claims, 15 Drawing Sheets

(56) References Cited

U.S. PATENT DOCUMENTS

2018/0330079 A1* 11/2018 Gray ..................... H04L 9/3247
2018/0330125 A1* 11/2018 Gray ....................... G06F 21/74
2018/0330343 A1* 11/2018 Gray .................. G06Q 20/3829

* cited by examiner

600

700

725

750

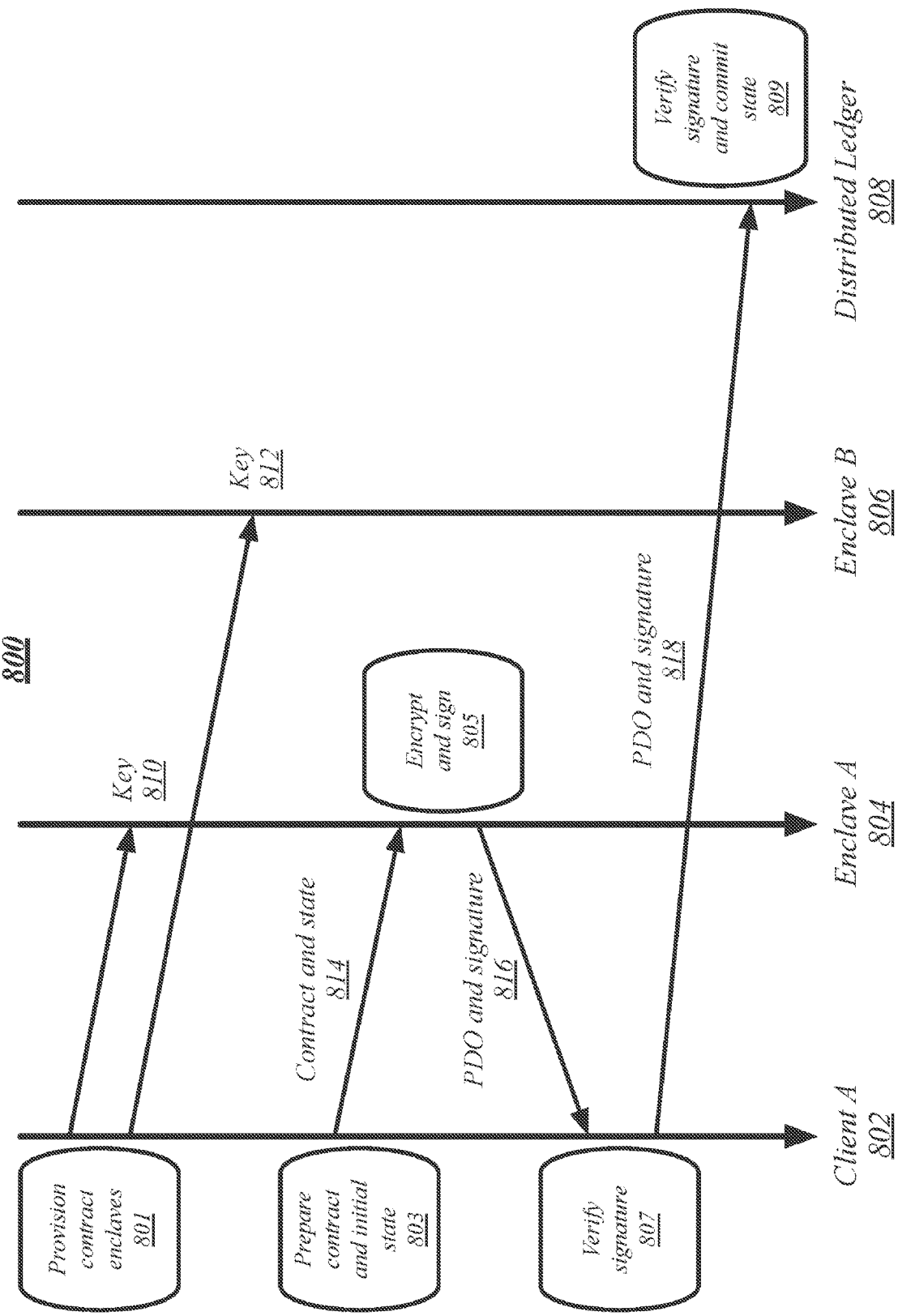

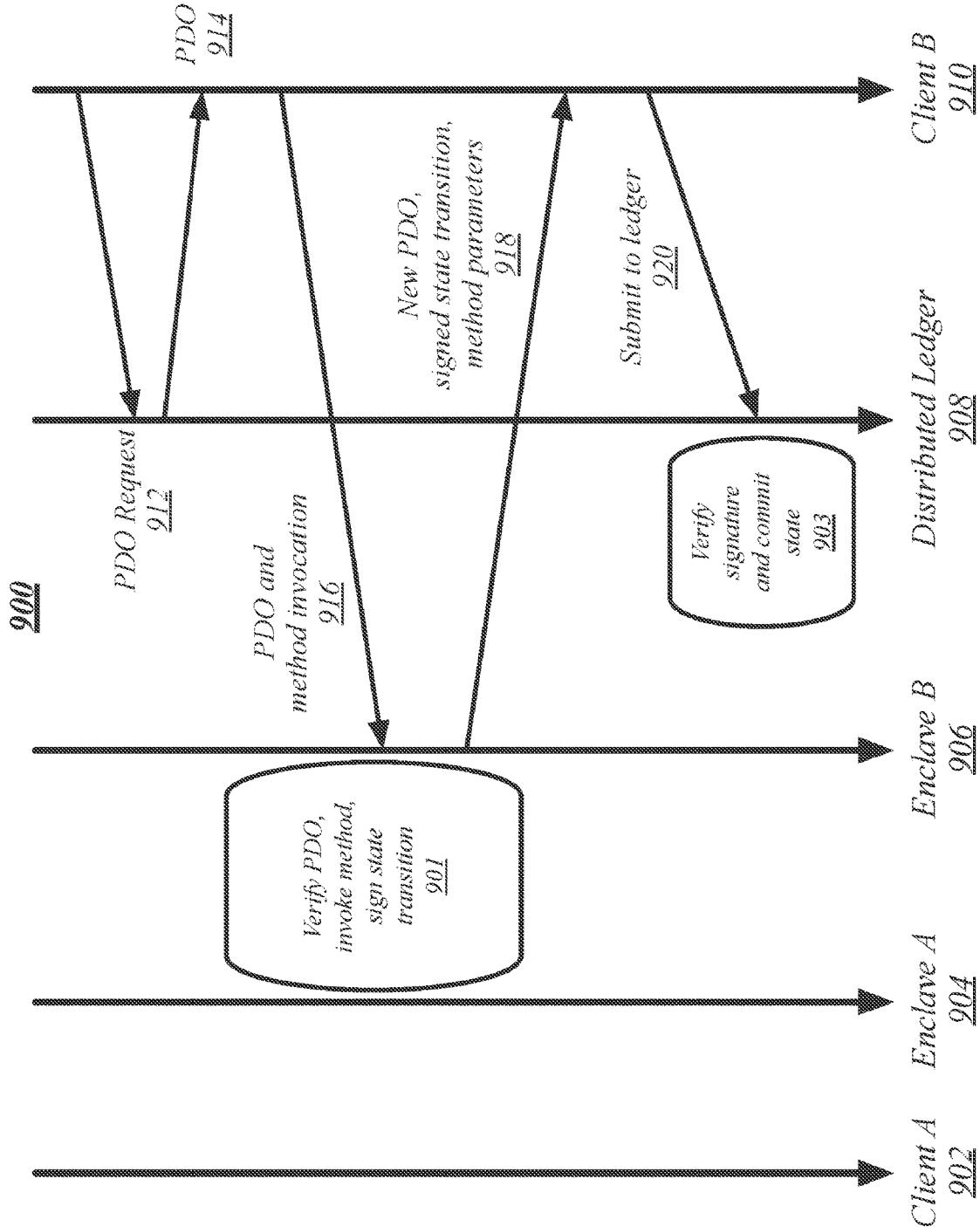

TECHNIQUES FOR SHARED PRIVATE DATA OBJECTS IN A TRUSTED EXECUTION ENVIRONMENT

CROSS-REFERENCE TO RELATED APPLICATIONS

This application is a continuation of, claims the benefit of and priority to previously filed U.S. patent application Ser. No. 15/721,723 filed Sep. 29, 2017, entitled "TECHNIQUES FOR SHARED PRIVATE DATA OBJECTS IN A TRUSTED EXECUTION ENVIRONMENT", which claims the benefit of and priority to previously filed U.S. Provisional Application Ser. No. 62/547,734 filed Aug. 18, 2017, entitled "TECHNIQUES FOR SHARED PRIVATE DATA OBJECTS IN A TRUSTED EXECUTION ENVIRONMENT", which are hereby incorporated by reference in their entireties.

BACKGROUND

In some devices utilizing trusted execution environments, sensitive portions of an application may be executed and/or stored in a secure environment, called an enclave, to protect both code and data from compromise. An application such as a distributed ledger that supports data objects, such as private, smart contracts, may use these enclaves to preserve confidentiality of the data object by encrypting the state of the data object within the enclave. To accomplish this, the enclave may generate encryption keys that can be saved in local, secured storage provided by a secure platform, such as Software Guard Extensions (SGX), in one example. While distributed ledger technology has enabled the sharing of data objects between parties, current implementations may not allow private sharing, and may be limited in the permissions given to shared data objects. Thus, improved techniques for sharing data objects are desired.

BRIEF DESCRIPTION OF THE DRAWINGS

FIG. 8 illustrates an embodiment of a system.
FIG. 9 illustrates an embodiment of a system.

DETAILED DESCRIPTION

Figure 1:
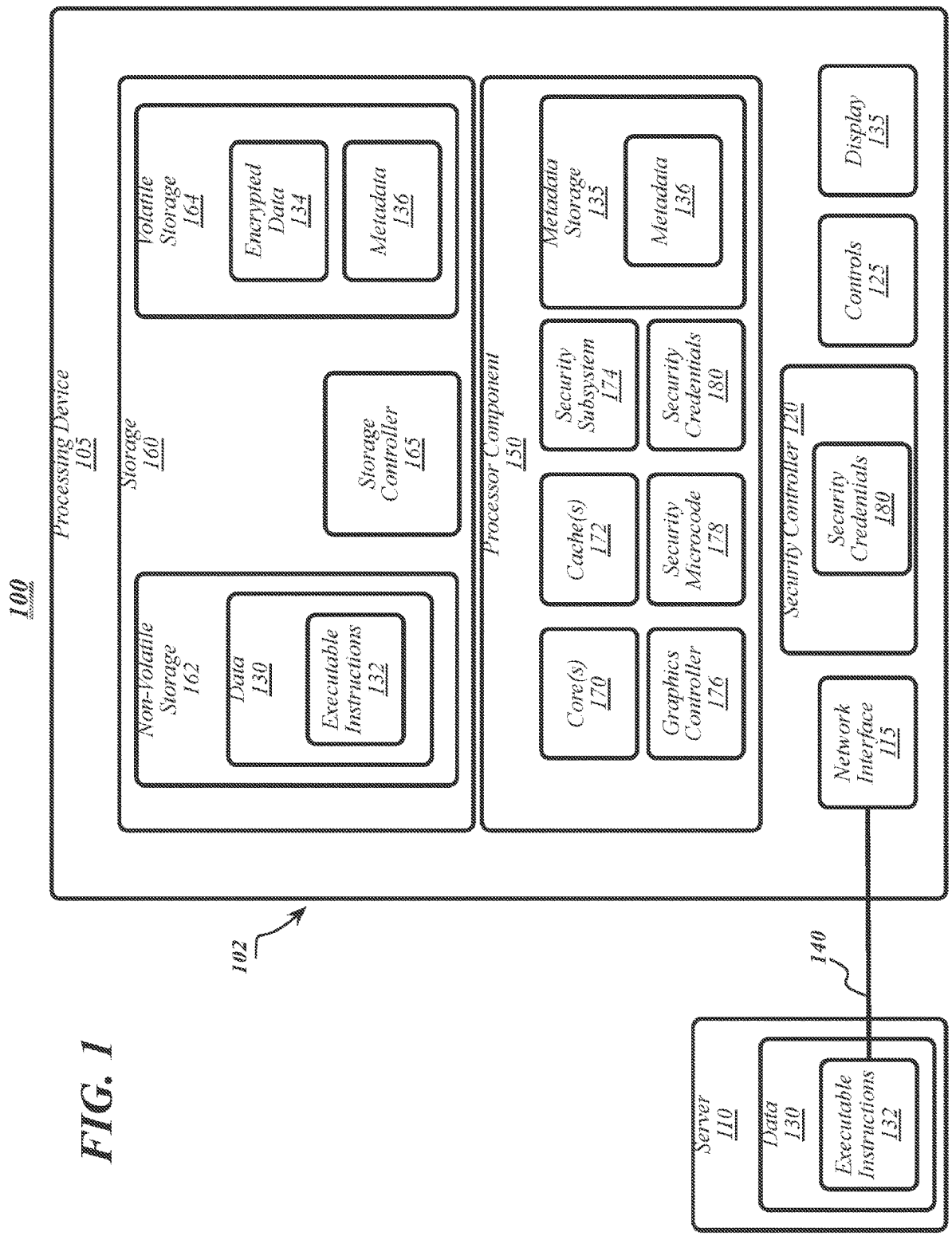
FIG. 1 illustrates an embodiment of an operating environment.

Techniques for sharing private data objects in a trusted execution environment using a distributed ledger are described. The techniques described herein may enable sharing of data objects, referred to herein as private data objects (PDOs), between individuals and organizations with access and update policies mediated by execution of code (referred to herein as a "smart contract") carried with the PDO in a trusted execution environment. Smart contract generally refers to a computer protocol intended to facilitate, verify, or enforce the negotiation or performance of a contract or policy. In some embodiments, secure, trusted, enclaves may be used as a location for code execution. A distributed ledger may serve as a "public commit log" to ensure that there is a single, authoritative instance of the object and provide a means of guaranteeing atomicity of updates across interacting objects.

Unlike shared database systems, techniques described herein may not require shared access to or trust in a shared database provider. Further, unlike other smart contract systems built on distributed ledgers, techniques described herein may not require that data be public or even accessible to all participants in the contract. Further, contracts need not be deterministic. PDOs, as set forth herein, may provide a very powerful mechanism for safely sharing data. Implementing access control as code may allow representation of sophisticated policies (e.g. the encoding of differential privacy within an access method to ensure that data privacy is maintained) that are bound to the data no matter how it is shared. PDOs, in some embodiments, may preclude "forwarding" (where once data is shared it can be passed on to others), an advantage over previous systems which may allow for such forwarding.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus.

Various general purpose machines may be used with programs written in accordance with the teachings herein, or it may prove convenient to construct more specialized apparatus to perform the required method steps. The required structure for a variety of these machines will appear from the description given.

FIGS. 1-4 describe trusted enclave environments and systems that may be used with one or more of the embodiments described herein. FIG. 1 illustrates an example of an operating environment 100 such as may be representative of some embodiments. In operating environment 100, which may include remote enclave authentication, a system 102 may include a server 110 and a processing device 105 coupled via a network 140. Server 110 and processing device 105 may exchange data 130 via network 140, and data 130 may include executable instructions 132 for execution within processing device 105. In some embodiments, data 130 may be include data values, executable instructions, and/or a combination thereof. Network 140 may be based on any of a variety (or combination) of communications technologies by which signals may be exchanged, including without limitation, wired technologies employing electrically and/or optically conductive cabling, and wireless technologies employing infrared, radio frequency, and/or other forms of wireless transmission.

In various embodiments, processing device 105 may incorporate a processor component 150, a storage 160, controls 125 (for instance, manually-operable controls), a display 135 and/or a network interface 115 to couple processing device 105 to network 140. Processor component 150 may incorporate security credentials 180, a security microcode 178, metadata storage 135 storing metadata 136, a security subsystem 174, one or more processor cores 170, one or more caches 172 and/or a graphics controller 176. Storage 160 may include volatile storage 164, non-volatile storage 162, and/or one or more storage controllers 165. Processing device 105 may include a controller 120 (for example, a security controller) that may include security credentials 180. Controller 120 may also include one or more of the embodiments described herein for unified hardware acceleration of hash functions.

Volatile storage 164 may include one or more storage devices that are volatile in as much as they require the continuous provision of electric power to retain information stored therein. Operation of the storage device(s) of volatile storage 164 may be controlled by storage controller 165, which may receive commands from processor component 150 and/or other components of processing device 105 to store and/or retrieve information therein, and may convert those commands between the bus protocols and/or timings by which they are received and other bus protocols and/or timings by which the storage device(s) of volatile storage 164 are coupled to the storage controller 165. By way of example, the one or more storage devices of volatile storage 164 may be made up of dynamic random access memory (DRAM) devices coupled to storage controller 165 via an interface, for instance, in which row and column addresses, along with byte enable signals, are employed to select storage locations, while the commands received by storage controller 165 may be conveyed thereto along one or more pairs of digital serial transmission lines.

Non-volatile storage 162 may be made up of one or more storage devices that are non-volatile inasmuch as they are able to retain information stored therein without the continuous provision of electric power. Operation of storage device(s) of non-volatile storage 162 may be controlled by storage controller 165 (for example, a different storage controller than used to operate volatile storage 164), which may receive commands from processor component 150 and/or other components of processing device 105 to store and/or retrieve information therein, and may convert those commands between the bus protocols and/or timings by which they are received and other bus protocols and/or timings by which the storage device(s) of non-volatile storage 162 are coupled to storage controller 165. By way of example, one or more storage devices of non-volatile storage 162 may be made up of ferromagnetic disk-based drives (hard drives) operably coupled to storage controller 165 via a digital serial interface, for instance, in which portions of the storage space within each such storage device are addressed by reference to tracks and sectors. In contrast, commands received by storage controller 165 may be conveyed thereto along one or more pairs of digital serial transmission lines conveying read and write commands in which those same portions of the storage space within each such storage device are addressed in an entirely different manner.

Processor component 150 may include at least one processor core 170 to execute instructions of an executable routine in at least one thread of execution. However, processor component 150 may incorporate more than one of processor cores 170 and/or may employ other processing architecture techniques to support multiple threads of execution by which the instructions of more than one executable routine may be executed in parallel. Cache(s) 172 may include a multilayer set of caches that may include separate first level (L) caches for each processor core 170 and/or a larger second level (L2) cache for multiple ones of processor cores 170.

In some embodiments in which processing device 105 includes display 135 and/or graphics controller 176, one or more cores 170 may, as a result of executing the executable instructions of one or more routines, operate controls 125 and/or the display 135 to provide a user interface and/or to perform other graphics-related functions. Graphics controller 176 may include a graphics processor core (for instance, a graphics processing unit (GPU)) and/or component (not shown) to perform graphics-related operations, including and not limited to, decompressing and presenting a motion video, rendering a 2D image of one or more objects of a three-dimensional (3D) model, etc.

Non-volatile storage 162 may store data 130, including executable instructions 132. In the aforementioned exchanges of data 130 between processing device 105 and server 110, processing device 105 may maintain a copy of data 130, for instance, for longer term storage within non-volatile storage 162. Volatile storage 164 may store encrypted data 134 and/or metadata 136. Encrypted data 134 may be made up of at least a portion of data 130 stored within volatile storage 164 in encrypted and/or compressed form according to some embodiments described herein. Executable instructions 132 may make up one or more executable routines such as an operating system (OS), device drivers and/or one or more application routines to be executed by one or more processor cores 170 of processor component 150. Other portions of data 130 may include data values that are employed by one or more processor cores 170 as inputs to performing various tasks that one or more processor cores 170 are caused to perform by execution of executable instructions 132.

As part of performing executable instructions 132, one or more processor cores 170 may retrieve portions of executable instructions 132 and store those portions within volatile storage 164 in a more readily executable form in which addresses are derived, indirect references are resolved and/or links are more fully defined among those portions in the process often referred to as loading. As familiar to those skilled in the art, such loading may occur under the control of a loading routine and/or a page management routine of an OS that may be among executable instructions 132. As portions of data 130 (including portions of executable instructions 132) are so exchanged between non-volatile storage 162 and volatile storage 164, security subsystem 174 may convert those portions of data 130 between what may be their original uncompressed and unencrypted form as stored within non-volatile storage 162, and a form that is at least encrypted and that may be stored within volatile storage 164 as encrypted data 134 accompanied by metadata 136.

Security subsystem 174 may include hardware logic configured or otherwise controlled by security microcode 178 to implement the logic to perform such conversions during normal operation of processing device 105. Security microcode 178 may include indications of connections to be made between logic circuits within the security subsystem 174 to form such logic. Alternatively or additionally, security microcode 178 may include executable instructions that form such logic when so executed. Either security subsystem 174 may execute such instructions of the security microcode 178, or security subsystem 174 may be controlled by at least one processor core 170 that executes such instructions. Security subsystem 174 and/or at least one processor core 170 may be provided with access to security microcode 178 during initialization of the processing device 105, including initialization of the processor component 150. Further, security subsystem 174 may include one or more of the embodiments described herein for unified hardware acceleration of hash functions.

Security credentials 180 may include one or more values employed by security subsystem 174 as inputs to its performance of encryption of data 130 and/or of decryption of encrypted data 134 as part of performing conversions there between during normal operation of processing device 105. More specifically, security credentials 180 may include any of a variety of types of security credentials, including and not limited to public and/or private keys, seeds for generating random numbers, instructions to generate random numbers, certificates, signatures, ciphers, and/or the like. Security subsystem 174 may be provided with access to security credentials 180 during initialization of the processing device 105.

Figure 2:
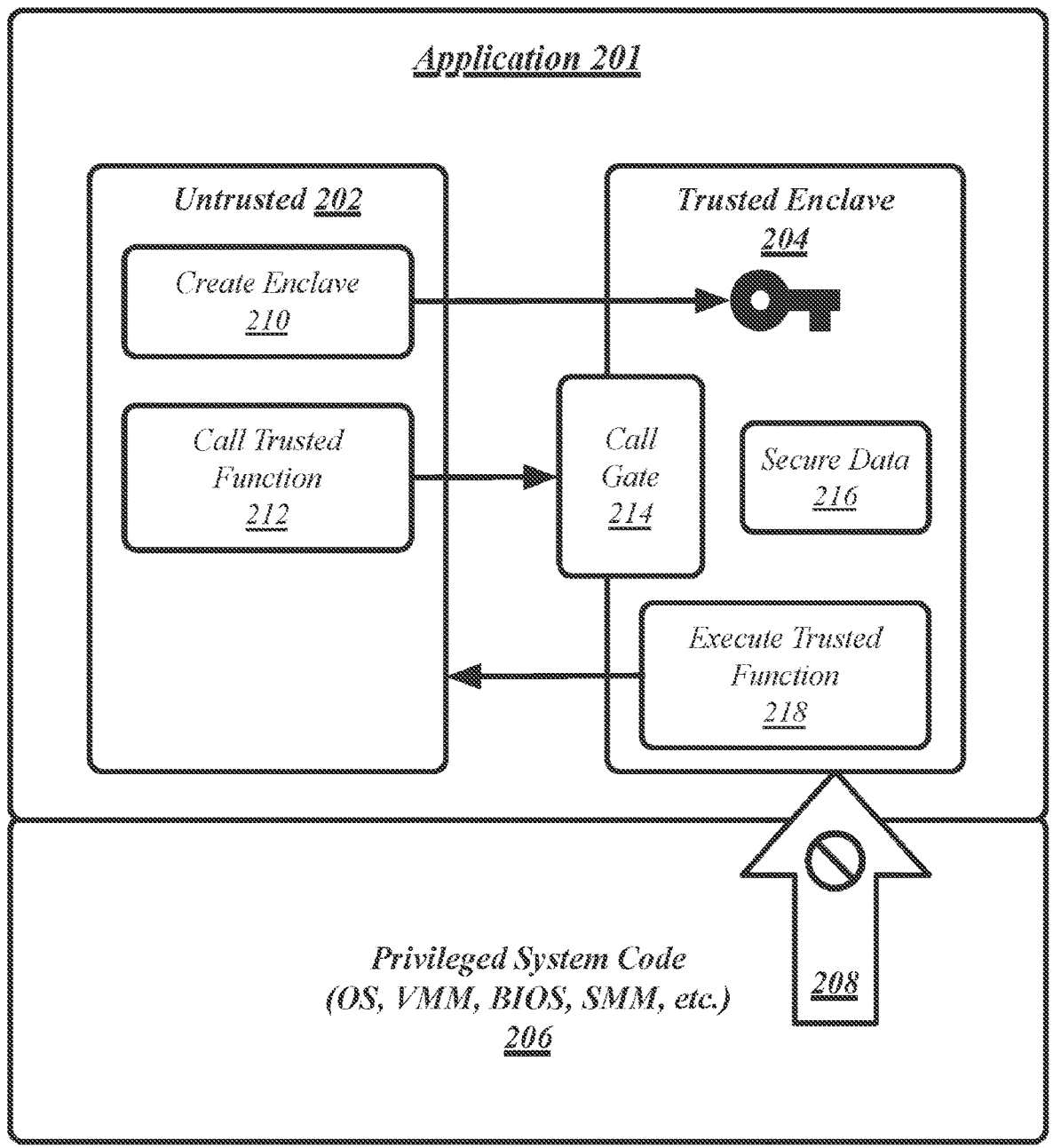
FIG. 2 illustrates an embodiment of a trusted enclave system.

FIG. 2 illustrates an embodiment of a trusted enclave system 200. Trusted enclave system 200 may include application 201, which may include one or more applications executing on a software and/or hardware platform. A few non-limiting examples of applications that may include secret data in need of protection are financial applications, electronic banking applications, and health or medical applications. In some embodiments, application 201 may include an untrusted partition 202, which may be a partition of application 201 that includes instructions and data that are generally unprotected from an attack. Privileged code 206 may include code of a platform that has special access, or privilege, to data within applications running on the platform. Privileged code may include the operating system, a virtual machine manager, system BIOS, or system management mode, for example. While these exemplary types of privileged code may be used here, it can be appreciated that other types of code may permanently or temporarily include privilege.

If malicious code were to infect privileged system code 206, it may have access to untrusted partition 202, since privileged system code 206 generally has access to application 201. Using a trusted enclave system, however, certain data may be kept secret and secure, even from an attack originating from privileged system code 206. In an example, application 201 may create a trusted enclave 204 at 210 to protect secret data and secure data 216. The creation of a trusted enclave 204 may generate a secure memory location, sometimes within a processor of a platform, accessible using the techniques described herein. Trusted enclave 204 may be configured to support certain trusted functions that may execute on secure data 216. Untrusted partition 202 may call a trusted function at 212 using a call gate 214, which may be a combination of software and hardware configured to accept certain trusted function calls at trusted enclave 204. The resulted of a trusted function call may be returned from trusted enclave 204 to untrusted partition 202, while secure data 216 remains protected within trusted enclave 204. In this manner, secure data 216 may be accessed using a limited set of trusted functions, secure data 216 may still be used within application 201, however, as shown by blockage 208, privileged system code 208 may be prevented from accessing secure data 216.

Trusted enclave system 200 allows for each application running on a platform to defend its own secret data using secure enclaves, significantly reducing the attack surface available to malicious code, especially malicious code that has infiltrated privileged system code 206. While the embodiment described within FIG. 2 illustrates a single platform, trusted enclave systems may be used within networked distributed systems, such as IoT. In these systems, as described later, a centralized trusted authority may be used to authenticate secure enclaves. However, as described below, improved techniques may circumvent the use of a centralized trusted authority and allow trusted enclaves running of multiple distributed processors to authenticate one another.

Figure 3:
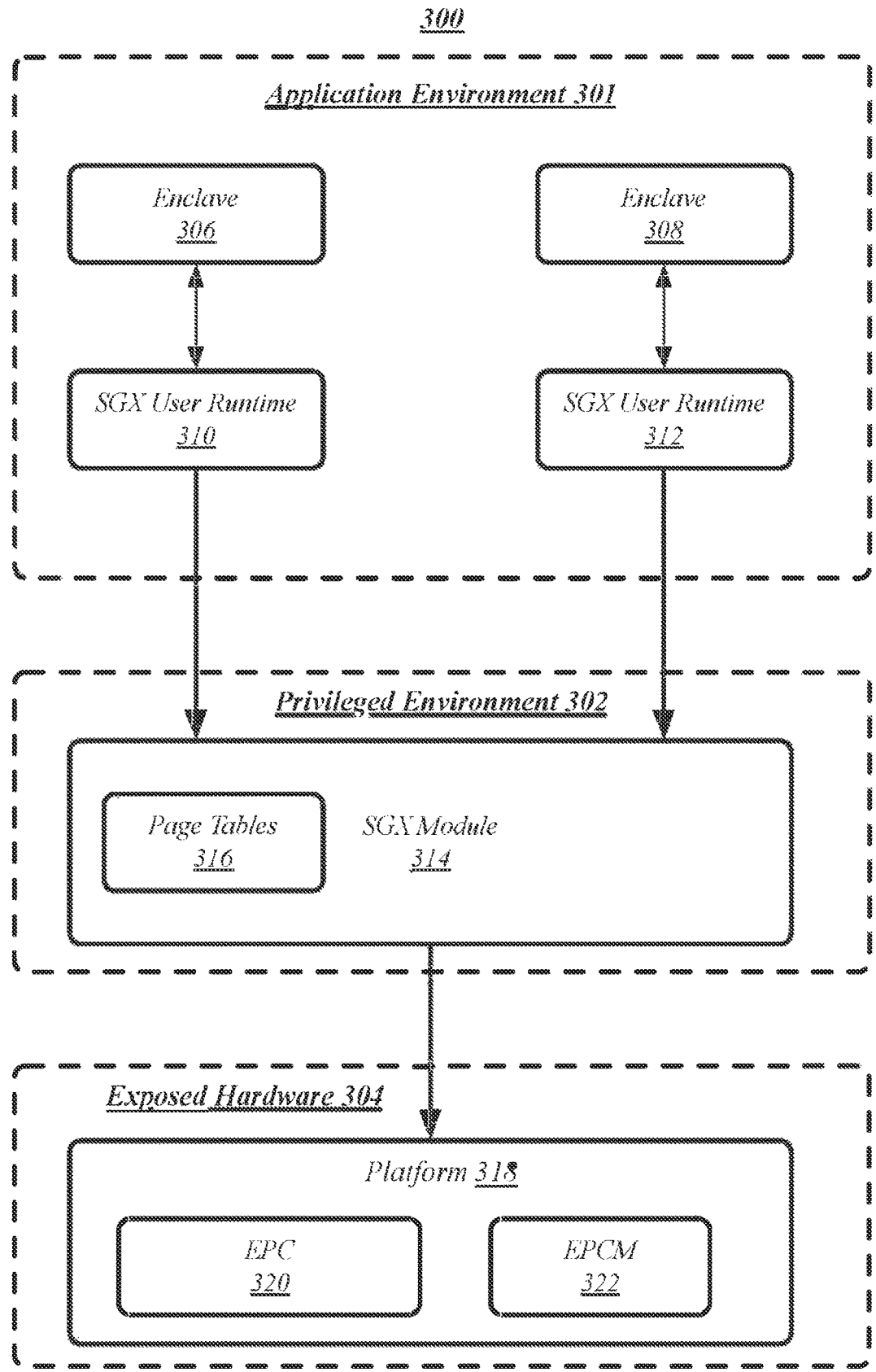
FIG. 3 illustrates an architecture of a trusted enclave system.

FIG. 3 illustrates an architecture of a trusted enclave system 300. Trusted enclave system 300 may include an application environment 301, privileged environment 302, and exposed hardware 304, each discussed in turn now. Application environment 301 may include one or more enclaves, 306, 308, each accessed using one or more SGX user runtime modules 310, 312. In this manner, each enclave 306, 308, may be accessed in a secure manner by privileged environment 302. Privileged environment 302 may include an SGX module 314, and pages tables 314. SGX module 314 may include a combination of software and hardware, and may be configured to request secret information, or perform trusted functions on secret information, from an enclave 306, 308 via SGX user runtimes 310, 312. Page tables 316 may store one or more memory locations for secret data stored within exposed hardware 304, for example. Exposed hardware 304 may include a computing platform 318, as described herein, and may include one or more processors configured to perform the techniques set forth within.

Platform 318 may include a storage device storing enclave page cache (EPC) 320 and enclave page cache map (EPCM) 322. EPC 320 may be a memory that includes a structure EPCM 322 for associating a set of access permissions with an enclave. EPC 320 may contain protected code and data in pages, which in some embodiments may be 4 KB pages in a non-limiting example. EPC 320 may store enclave pages and SGX structures, and EPC pages may be valid or invalid. A valid EPC page may contain either an enclave page or an SGX structure. The security attributes for each EPC page may be held in an internal micro-architecture structure called EPCM, discussed below.

EPCM 322 may contain metadata of enclave pages and may be a protected structure used by a processor to track the contents of EPC 320. EPCM 322 may be comprised of a series of entries with exactly one entry for each page in EPC 320. It can be appreciated that alternate embodiments may not require a 1:1 correlation. EPCM 322 may be managed by the processor as part of various SGX instructions and may not be directly accessible to software or to devices. The format of EPCM 322 may be microarchitectural and is implementation dependent. However, logically, each EPCM entry may hold one or more of the following: whether the EPC page is valid or invalid; the enclave instance that owns the page; the type of page (REG, TCS, VA, SECS); the virtual address through which the enclave can access the page; the enclave specified read/write/execute permissions on that page; and/or whether the page is accessible or not (BLOCKED or UNBLOCKED). The EPCM structure may be used by the processor in the address translation flow to enforce access-control on the enclave pages loaded into the EPC. Logically it may provide an additional secure layer of access control in addition to "legacy" segmentation, paging tables, and extended paging tables mechanisms.

Figure 4:
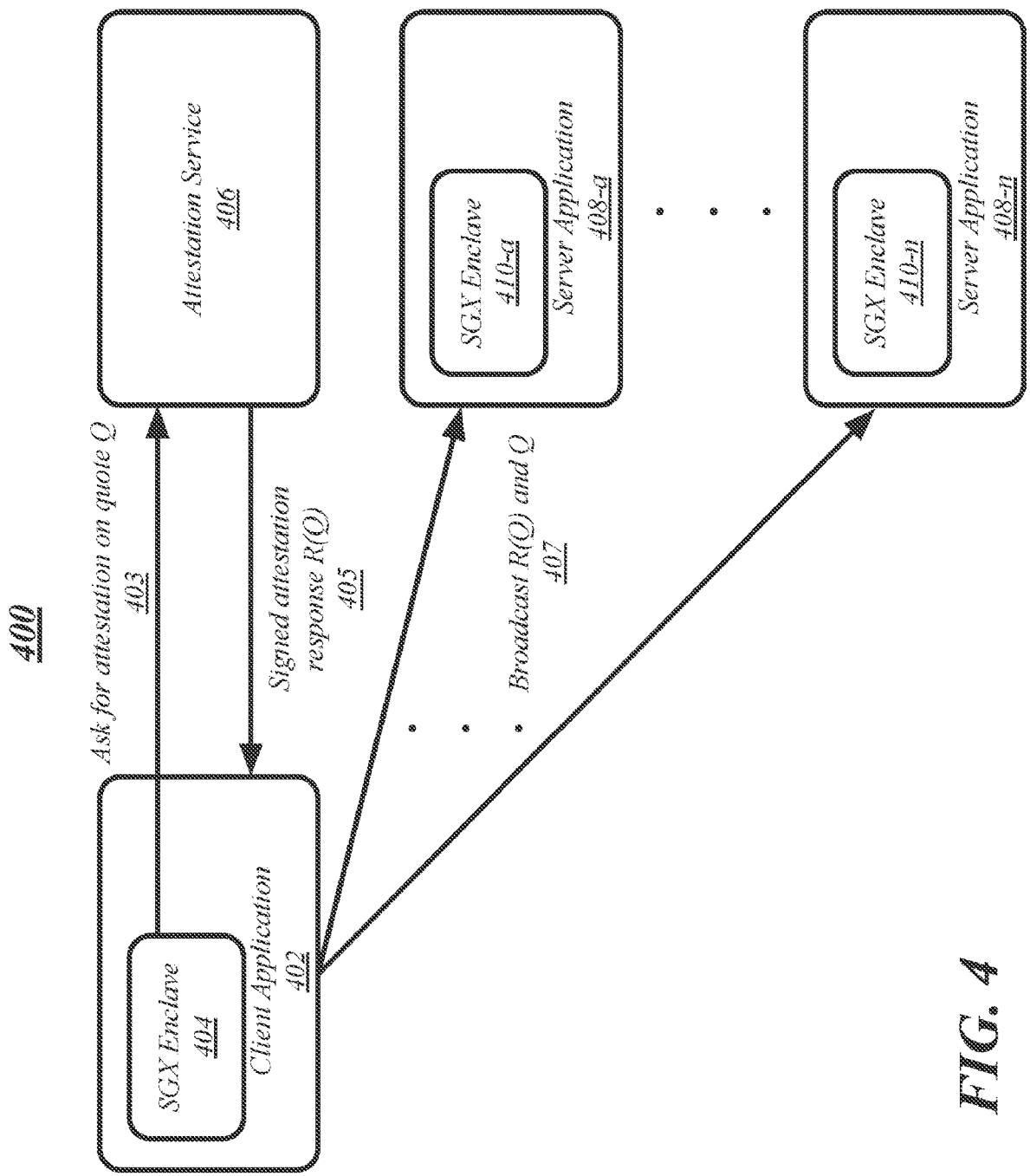
FIG. 4 illustrates an embodiment of a system.

FIG. 4 illustrates a block diagram for a system 400. In one embodiment, the system 400 may comprise one or more components. Although the system 400 shown in FIG. 4 has a limited number of elements in a certain topology, it may be appreciated that the system 400 may include more or less elements in alternate topologies as desired for a given implementation. The system 400 may include a plurality of modules, which may each include one or more processing units, storage units, network interfaces, or other hardware and software elements described in more detail herein. In some embodiments, these modules may be included within a single device. In other embodiments, one or more modules may be part of a distributed architecture, an example of which is described with respect to FIG. 9.

In an embodiment, each module of system 400 may comprise without limitation, a mobile computing device, a smart phone, a cellular telephone, a device connected to the Internet of Things (IoT), a handset, a personal digital assistant, a one-way pager, a two-way pager, a messaging device, a computer, a personal computer (PC), a desktop computer, a laptop computer, a notebook computer, a handheld computer, a tablet computer, or a wearable computing device such as a smart watch. Further, modules may include a server, which may comprise without limitation a single server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, system 400 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 400, and components and/or modules within a device of system 400, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the various modules and storages of system 400 may be organized as a distributed system. A distributed system typically comprises multiple autonomous computers that communicate through a computer network. The computers may interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

System 400 may include SGX enclave 404. While enclave 404 may be illustrated as an SGX enclave, it can be appreciated that other types of enclaves may be used in some embodiments. In this example, enclave 404 may be part of an SGX, which may allow devices to execute sensitive portions of an application, such as client application 402, in a secure environment, called an enclave, to protect both code and data from compromise. In distributed applications, such as IoT systems, in one example, enclaves residing on different processors may be required to mutually authenticate to establish secure communication channels. Currently, many solutions that allow two remote SGX enclaves to authenticate one another rely upon a centralized trusted authority. Some solutions, like TLS authentication, may rely on the interaction with a centralized Certification Authority (CA) for distribution and verification of public-key certificates. The certificates in these instances may be issued to individuals or corporations and expose individual identity.

The system set forth within FIG. 4 may use the authentication provided by the Intel Attestation Server (IAS) for any SGX enclave without the need for a centralized trusted authority. It can be appreciated that other types of attestation servers may be used in various embodiments. In some embodiments, authentication may be based on the hardware enhanced privacy ID (EPID) rather than an identifier connected to an individual or application. In this manner, the privacy of the individual platform or its user may be preserved. Authentication, in some embodiments, may therefore be anonymous, proving that the enclave is running in valid SGX hardware while protecting the identity of the device and/or user. An enclave may then trust attestation by the remote enclave of the code that it is running. In this manner, techniques described herein may provide several advantages including, allowing for the protection of the identity of SGX devices and owners, since in some embodiments, a public-key certificate may be issued anonymously to an SGX enclave running on valid SGX hardware. Further, techniques described herein may require minimal modifications to SGX-based distributed applications that may need to be strengthened with authentication. Still further, as mentioned above, techniques described herein may provide authentication between enclaves without the need for a centralized authority.

As illustrated within FIG. 4, a client application 402, which may be running on a client device as described herein, may execute and/or store data using a secure enclave, such as SGX enclave 404. SGX enclave may reside on one or more processors of a client device in some embodiments. While specific examples are used throughout, the techniques described may be used with any processor within various types of trusted execution environments. As set forth above, while enclave 404 may be illustrated as an SGX enclave, other secure enclaves may be used in some embodiments. SGX enclave 404 may generate data that to be sent to other secure enclaves, such as SGX enclaves 410-a-n which may reside on one or more server devices, which may each respectively run one or more server applications 408-a-n, where a and n represent positive integers. Each of SGX enclaves 410-a-n may reside on different processors, and thus may be required to be authenticated to establish secure data communication channels with SGX enclave 104.

In an embodiment, an SGX enclave 404 may generate an SGX report containing a cryptographic hash of the data using any well-known cryptographic hashing algorithm, such as SHA-1 or SHA-256, for example. Client application 402 may generate a linkable quote on the SGX report, which may be signed by a Quoting Enclave (QE) (not shown) which may, in turn, generate a quote that contains the report and the cryptographic hash. In some embodiments, a quoting enclave may be included within a device as a separate component from an SGX enclave, and may be configured to generate quotes as set forth herein. At 403, SGX enclave 404 may request for attestation of the quote Q from attestation service 406, IAS in some examples, which may reside on a remote server. The attestation response 405 from attestation service 406 may be signed with a public IAS Report Key and may contain a copy of the quote, as illustrated.

Client application 402 may, at 407, send the quote, the IAS attestation report on said quote and the data, to one or more other enclaves residing on different processors, such as SGX enclaves 410-a-n. These enclaves may verify the validity of the quote by checking the signature on the IAS response with the IAS Report Key. The recipient enclave may verify that the cryptographic hash of the data corresponds to the hash within the quote. In this manner, the data may be trusted to come directly from the sending enclave.

Now turning to FIGS. 5-8, which represent one or more embodiments of provisioning systems configured according to the techniques described herein. In the following, communications between any two entities may be secure and authenticated using public key cryptography. Further, each community may have a predefined policy that identifies the contract owner and which enclave and provisioning service (PS) identities are acceptable. Further, the availability of a distributed ledger (or another secure shared registry that can be accessed by the provisioning services) may be assumed. Such a distributed ledger may be implemented using various techniques, such as blockchain, in some embodiments. In general, a distributed ledger (also called shared ledger) is a consensus of replicated, shared, and synchronized digital data geographically spread across multiple sites, countries, or institutions. While blockchain is described as an example, it can be appreciated that other protocols for a distributed ledger may be used in some embodiments. Throughout the description, the following variables may be used:

CO: contract owner
OPK: public key of the CO
CID: contract identifier
$PS_i$: the $i^{th}$ provisioning service
$PSPK_i$: the public signing key $PS_i$
$PSSK_i$: the private signing key $PS_i$
$E_j$: the $j^{th}$ enclave
$APK_j$: authentication public key for enclave j
$EPK_j$: encryption public key for enclave j
$S_{i,j}$: plaintext keyshare created by provisioning service $PS_i$ for enclave $E_j$
$EKS_{i,j}$: encrypted keyshare for $E_j$ produced by $PS_i$
K: The key derived from all the shares
$KEK_i$—Key encryption key for $E_i$. Derived as a function of CID and SGX Enclave Seal Key. It is used to encrypt K with authenticated encryption
$EK_i$: Authenticated encryption of K with $KEK_i$ (contains IV and MAC if needed)

Figure 5:
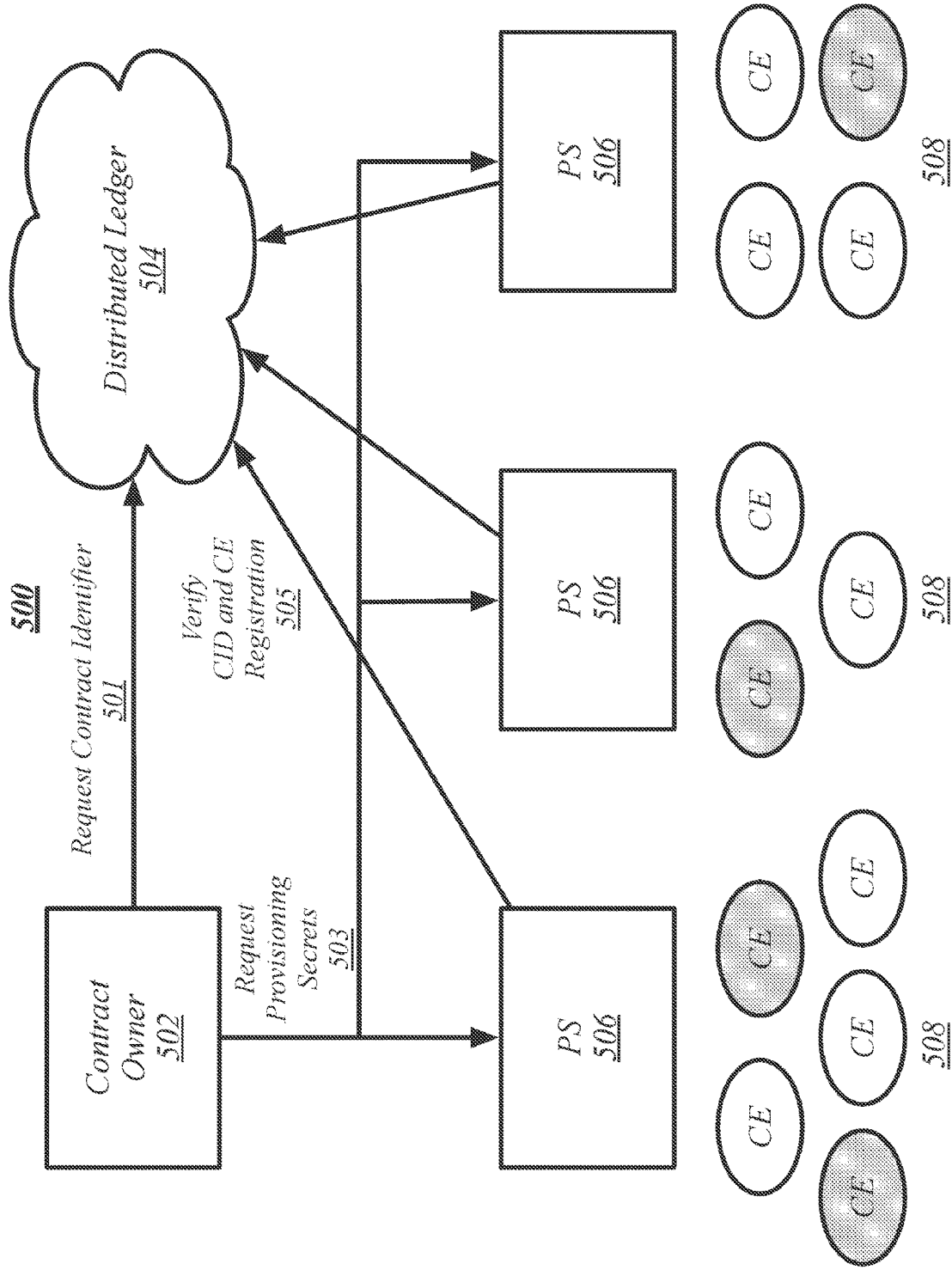
FIG. 5 illustrates an embodiment of a system.

FIG. 5 illustrates a system 500 according to an embodiment. System 500 may include contract owner 502, distributed ledger 504, provisioning services 506, and enclaves 508 for executing smart contracts (referenced herein as "contract enclaves"). Each of contract owner 502, distributed ledger 504, provisioning services 506, and contract enclaves 508 may be included within a distributed computing device as described herein. For example, contract enclaves 508 may be included within a server, or many servers, connected using the techniques described herein. In some embodiments, a distributed computing device may include one or more elements, for example a provisioning service and one or more contract enclaves. However, in other embodiments, each element may be part of a separate distributed computing device. Provisioning services and enclaves may be comprised of a combination of hardware and software, and may implement one or more of the techniques described herein. Each element within the distributed architecture may be connected using secure channels, and messages used for provisioning as described herein may be secured using public key authentication and encryption.

Distributed ledger 504 may be a shared ledger in a distributed computing environment. Distributed ledger 504 may be a consensus of replicated, shared, and synchronized digital data geographically spread across multiple sites, countries, or institutions. In some embodiments, there is no central administrator or centralized data storage used to implement distributed ledger 504. As set forth above, while blockchain is one type of data structure used to implement a distributed ledger, it can be appreciated that other types of distributed ledger technology may be used with embodiments described herein.

Techniques described herein leverage the use of a distributed ledger 504 in a distributed architecture to securely provision a plurality of enclaves 508 without maintaining a central authority. In this manner, techniques may securely provision a set of enclaves 508 (so that no single enclave can deny access to the contract state) with a common encryption key that does not depend on the trustworthiness of any single organization or individual. Key generation may be distributed across a multiplicity of "provisioning servers," also referred to as provisioning services 506 throughout. While examples herein may refer to enclaves, or SGX enclaves, the techniques described herein may be used within a variety of trusted execution environments.

In an embodiment using enclaves, to provision a set of enclaves 508 with encryption keys, contract owner 502 may contact several provisioning services 506 (the number of server may depend on a risk tolerance, which may be received by a contract owner within a policy or otherwise in a predetermined manner). Each provisioning service may produce a random "keyshare" that is sent to each of the enclaves through a secure channel. A keyshare, as used herein, may include a randomly generated portion of an encryption key, each of which is then signed by a private key of the provisioning service that generated the keyshare. Each of the enclaves may combine the keyshares to derive the final encryption key. In this manner, if at least one of the provisioning services produces a truly random keyshare, the resulting encryption key will be unique and unpredictable. That is, no provisioning service will possess sufficient information to construct the encryption key.

Before an enclave is provisioned it may be required to register its authentication (APK) and encryption (EPK) public keys with the distributed ledger 504. Contract owner 502 may be configured to register a contract identifier 501 with distributed ledger 504. In this manner, distributed ledger 504 may be used to verify the contract identifier, and the APK and EPK of each enclave through the provisioning techniques described herein. Next, contract owner 502 may be configured to select for provisioning a set of contract enclaves from among a pool of available contract enclaves 508, and request provisioning secrets 503, i.e., keyshares, from provisioning services 506. In an embodiment, a policy for a community of devices within a distributed network may set forth a number of requirements, including the identification of enclaves and provisioning services that may be used. For example, specific devices may be identified, or requirements that must be met by a particular device may be required. These requirements may include processor, memory, latency, security, or software requirements, among others. Provisioning services 506 may be configured to verify the contract identifier and contract enclaves 505 with distributed ledger 504, as described within FIGS. 7A-C.

Figure 6:
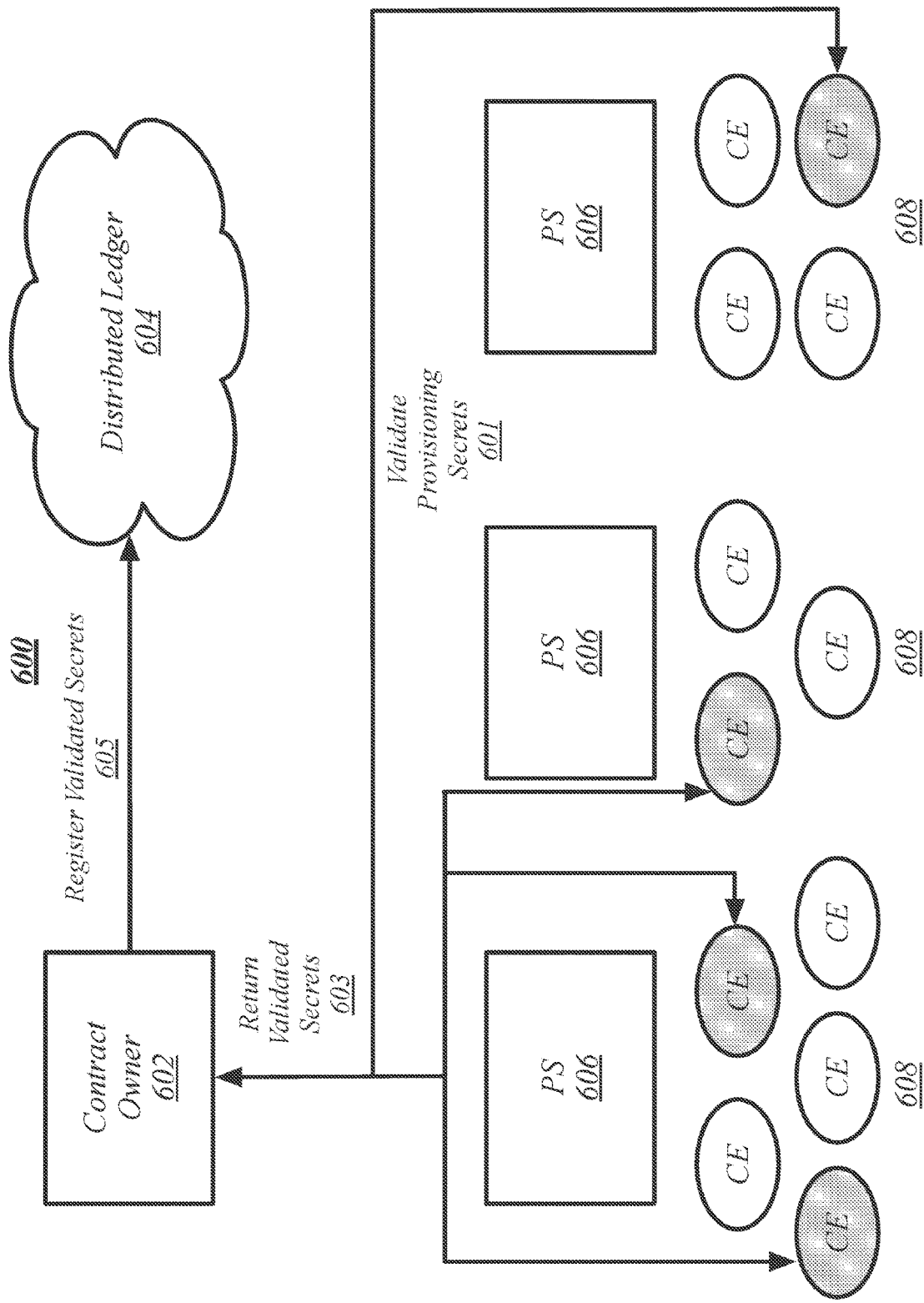
FIG. 6 illustrates an embodiment of a system.

FIG. 6 illustrates a system 600 according to an embodiment. FIG. 6 includes like-numbered elements to FIG. 5, such as contract owner 602, distributed ledger 604, provisioning services 606, and contract enclaves 608. At 601, contract owner 602 may be configured to validate provisioning secrets with each of the selected contract enclaves 608. Then each of the selected contract enclaves 608 may be configured to return validated secrets 603 to contract owner 602. Finally, validated secrets 605 may be registered with the distributed ledger 604. These operations are set forth more specifically with respect to FIGS. 7A-7C, discussed below.

Figure 7A:
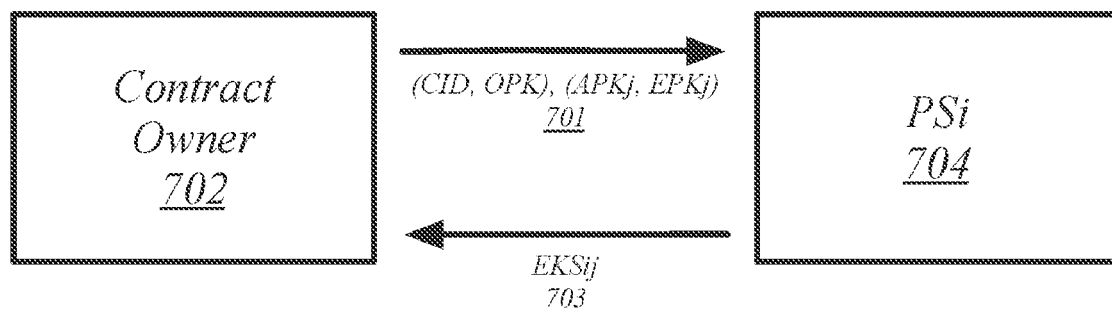
FIG. 7A illustrates an embodiment of a system.

FIG. 7A illustrates a system 700 according to an embodiment. System 700 may include a contract owner 702 and provisioning service 704. To provision one or more enclaves, contract owner 702 may first register the CID (contract identifier) and OPK (the public key of the contract owner) with a distributed ledger. Once the CID and OPK are registered, at 701, the CO may request a keyshare from each provisioning service for each enclave to be provisioned. That is, for M enclaves and N provisioning services, there will be a total of M*N keyshares created.

To provision a specific enclave Ej with an encryption key, the contract owner 702 may contact a set of provisioning services {P1, ... PN} with the CID, and the authentication and encryption public keys for the enclave (APKj and EPKj, as illustrated at 701 of FIG. 7A. Each provisioning service, such as provisioning service 704, may use the distributed ledger to verify the identity of the contract owner 702 (using the provided OPK) and the authentication and encryption keys of the enclave. Once the contract owner 702 and enclave keys have been verified, a provisioning service PSi 704 may generate a random keyshare $S_{i,j}$. The provisioning service may sign with its private key (PSSKi) the keyshare ($S_{i,j}$), the CID, the contract owner's identity (OPK), and the EPK. The provisioning service 704 may then encrypt the keyshare and signature with the enclave's public key (EPK) as follows and return to contract owner 702 at 703: $EKS_{i,j}$=encrypt(EPKj, $S_{i,j}$|sign(PSSKi, $S_{i,j}$|SID|OPK|APKi)).

Figure 7B:
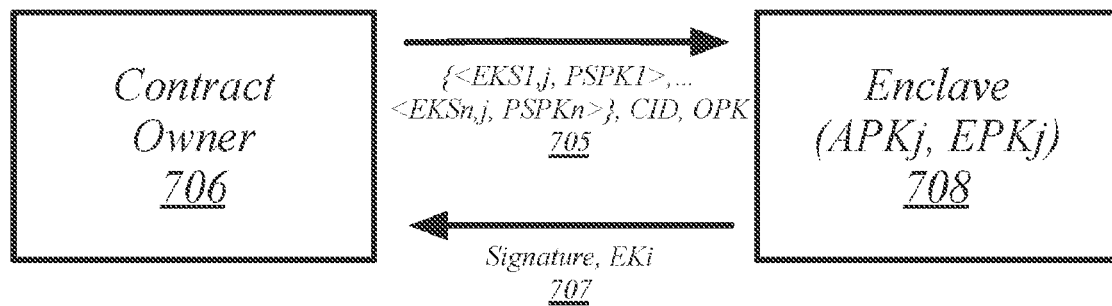
FIG. 7B illustrates an embodiment of a system.

FIG. 7B illustrates a system 725 according to an embodiment. System 725 may include a contract owner 706 and enclave 708. As the final step in provisioning an enclave 708, the contract owner 706 may send, at 705, to the enclave 708 the collection of encrypted secrets and corresponding signing keys: {<$EKS_{1,j}$, PSPK1>, ... <$EKS_{N,j}$, PSPKN>} along with the CID and OPK. The enclave may decrypt each of the encrypted secrets, verify the signature of the provisioning service, the CID and OPK with a distributed ledger. Next, enclave 708 may derive the KEKi from the CID and its Seal Key, derive a secret key K from the received keyshares, use the KEKi for authenticated encryption of K to produce its encrypted version EKi (including IV and MAC if necessary), and returns a signature on all of the inputs and EKi at 707.

Figure 7C:
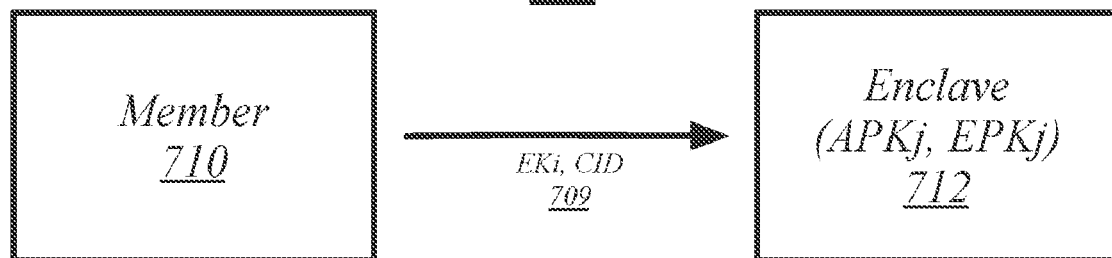
FIG. 7C illustrates an embodiment of a system.

FIG. 7C illustrates a system 750 according to an embodiment. System 750 may include member 710 and enclave 712. Member 710 may be a device within a community of a distributed system and may provision enclave 712 as follows. The contract owner may distribute the collection {<$EKS_{1,j}$, PSPK1>, ... <$EKS_{N,j}$, PSPKN>}, the signature and EKi to the participants of a distributed community (it may be assumed that the participants obtained CID and OPK already), including member 710. The contract owner may repeat these steps for each of the N enclaves that were provisioned. The other members, such as member 710, may verify that the parameters for the enclaves are acceptable according to requirements set forth within a community policy (i.e., processor, memory, latency, security, or software requirements, among others.) If the enclaves are acceptable under a community policy, they may be used by each member by provisioning them according to FIG. 7C. For example, enclave Ej is provisioned by sending EKi and CID from member 710 to Enclave 712. Enclave 712 may be configured to decrypt the EKi and authenticate K before using it, and once authentication has been completed, enclave 712 may be used by member 710 as described herein.

Included herein is a set of one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates a system 800 according to an embodiment. System 800 may include a client 802, enclave 804, enclave 806, and a distributed ledger 808. When a PDO is created, at 801, techniques described above may be used to provision an encryption key 810, 812 into a set of contract enclaves 804, 806. In some embodiments, a contract enclave may be an SGX enclave that is running a contract language interpreter. A contract language interpreter may include a combination of software and/or hardware capable of enforcing the terms of a contract within a PDO, such as a smart contract. In an example, a restricted Scheme language interpreter may be used for contract execution, however, other interpreters, such as the Ethereum Solidity contract language, could be used. As described above, the provisioning process may prevent exposure of the PDO encryption key outside of a contract enclave. In other words, the contract enclaves are the only entities capable of constructing the encryption key from the provisioned keyshares.

At 803, the initial owner, client 802, of the PDO contacts one of the provisioned contract enclaves and may request that the enclave create the PDO using contract and state 814. In an embodiment the contract may set forth the terms of a contract to be stored within, and executed by, a PDO. The state may include an initial state of the contract, that is, the state of the contract before a party has performed a method set forth within the contract, for example. At 805, the contract enclave may return to the owner the encrypted PDO and a cryptographic signature 816 that may be used to verify the integrity of the enclave at 807.

At 809, the PDO owner 802 may submit the encrypted PDO and the cryptographic signature (which may be used to prove the PDO was created by a contract enclave) 818 to a commit and coordination log, which may be a distributed ledger. The distributed ledger may be configured to verify the signature and any states committed to the PDO within one or more of the provisioned enclaves.

FIG. 9 illustrates a logic flow 900 according to an embodiment. System 900 may include a client 902, enclave 904, enclave 906, a distributed ledger 908, and a client 910. Access to the data in a PDO by all participants may be constrained by rights granted in the contract code that manages it, i.e., data is never visible unless the contract allows it. Interaction with the object may occur exclusively within and through contract code running in a contract enclave. A distributed ledger may be used as a data commit log to ensure that, however a PDO is shared, there is at most a single authoritative instance of the object on which all parties agree.

To interact with the PDO 914, a client 910 may, at 912, request and retrieve the current version from the distributed ledger 908. Client 910 may then select a provisioned contract enclave that is capable of interacting with the PDO. In an embodiment, if no such contract enclave exists, or if another is more readily available or preferred, a client may provision a new contract enclave. Once a provisioned contract enclave is created and/or selected, the client may submit the current PDO and a method invocation to the contract enclave at 916. In this manner, the PDO may be interacted within only within a provisioned contract enclave.

At 901, the contract enclave 906 may decrypt the PDO with the provisioned encryption key, verify the integrity of the PDO, and invoke the contract method with the provided parameters. In an embodiment, one or more policies encoded in the contract may determine whether the invocation is valid. Assuming the invocation was permitted, at 918, the contract enclave may encrypt the new version of PDO and return it to the client 910 along with a cryptographic signature of the state transition (the old and new PDO) and the parameters in the invocation.

At 920, the client 910 may submit the state transition (old and new PDO), the method invocation, and the signature to the distributed ledge 908. At 903, the distributed ledger 908 may verify the integrity of the signature and ensure that the PDO transition extends the most recently committed version of the PDO. The distributed ledger may then commit the change and store the PDO until it is invoked again. The use of the distributed ledger with the techniques described herein allows for the method invocation and any randomness generated to be encoded along with the state of the PDO so that other contract enclaves can verify the transition. This is particularly important if there are concerns about the integrity of the contract enclave that generated the transition. Specifically, a contract enclave may verify the work of another contract enclave by decrypting the PDO and replaying the log of method invocations stored with the state. The contract interpreter may replace any calls to the random function with responses logged in state in some embodiments.

The techniques described herein may be used for binding data and contract into a PDO. For example, techniques may include a method for encapsulating private data in PDO that uses a secure enclave to enforce a contract for access and update. In this manner, the contract is bound to the data and is enforced regardless of how and with whom the data is shared. That is, interaction with the object occurs exclusively in and through instances of a "contract enclave" that enforces the contract. In this way, techniques may extend to include smart contracts for data access and may include a method for shared data where all parties, including the owner, are constrained by rights granted in the contract that manages the data no matter where the data resides. In this manner, data in a contract is never visible unless (and how) the contract allows it.

Further, techniques may include using a distributed ledger as a data commit log. For example, the use of a distributed ledger may ensure that, no matter how a PDO is shared, there is at most a single, authoritative instance of the object on which all parties agree. For example, a PDO may be shared amongst a variety of clients, but cannot be invoked, edited, or viewed outside of a provisioned contract enclave. Moreover, any state changes will be committed to a distributed ledger. In this way, techniques may include non-deterministic smart contracts and may include a consensus-preserving method for supporting non-deterministic smart contracts through the encoding of randomness (or other non-determinism) in the state of a smart contract such that the state of a non-deterministic contract can be verified independently.

Figure 10:
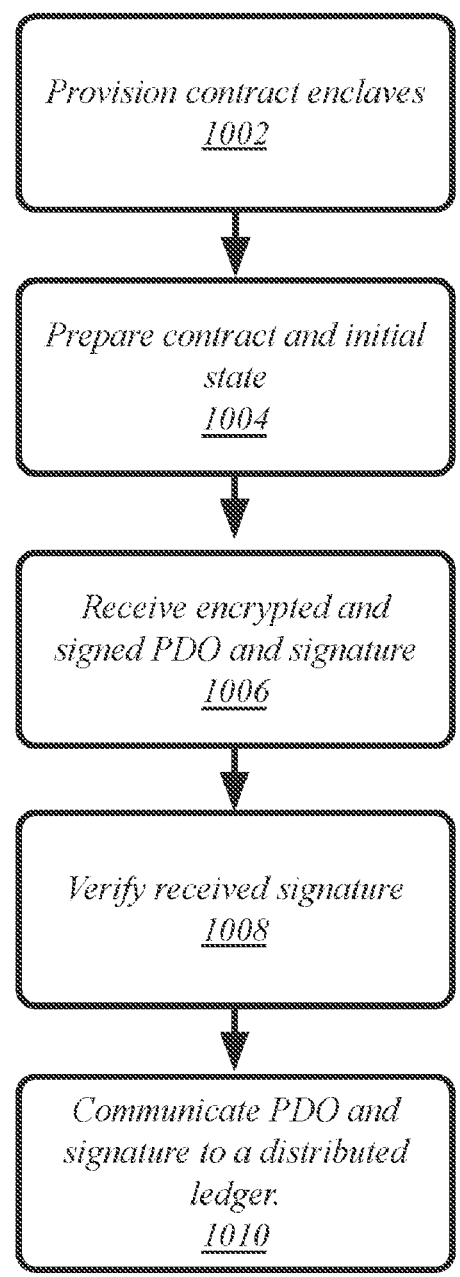
FIG. 10 illustrates a logic flow according to an embodiment.

FIG. 10 illustrates a logic flow 1000 according to an embodiment. At 1002, when a PDO is created techniques described above may be used to provision an encryption key into one or more contract enclaves of a set of contract enclaves. A contract enclave may be an SGX enclave that is running a contract language interpreter, such as a restricted Scheme language interpreter for contract execution though other interpreters, such as the Ethereum Solidity contract language, could be used). The provisioning process may prevent exposure of the PDO encryption key outside of a contract enclave (that is, the contract enclaves are the only ones capable of constructing the encryption key from the provisioned secrets).

At 1004, the initial owner of the PDO may contacts one of the provisioned contract enclaves and requests that the enclave create the PDO (contract and state). At 1006, the contract enclave may return to the owner the encrypted PDO and a cryptographic signature that can be used to verify the integrity of the enclave at 1008.

At 1010, the PDO owner 1010 may submit the encrypted PDO and the cryptographic signature (which proves that the PDO was created by a contract enclave) to a commit and coordination log, a distributed ledger which verifies the signature and commits the PDO.

Figure 11:
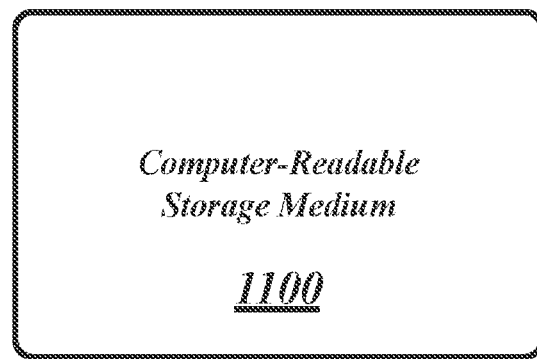
FIG. 11 illustrates an article of manufacture according to an embodiment.

FIG. 11 illustrates an article of manufacture according to an embodiment. Storage medium 1100 may comprise any computer-readable storage medium or machine-readable storage medium, such as an optical, magnetic or semiconductor storage medium. In some embodiments, storage medium 1100 may comprise a non-transitory storage medium. In various embodiments, storage medium 1100 may comprise an article of manufacture. In some embodiments, storage medium 1100 may store computer-executable instructions, such as computer-executable instructions to implement logic flows 800, 900, and 1000, for example. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited to these examples.

Figure 12:
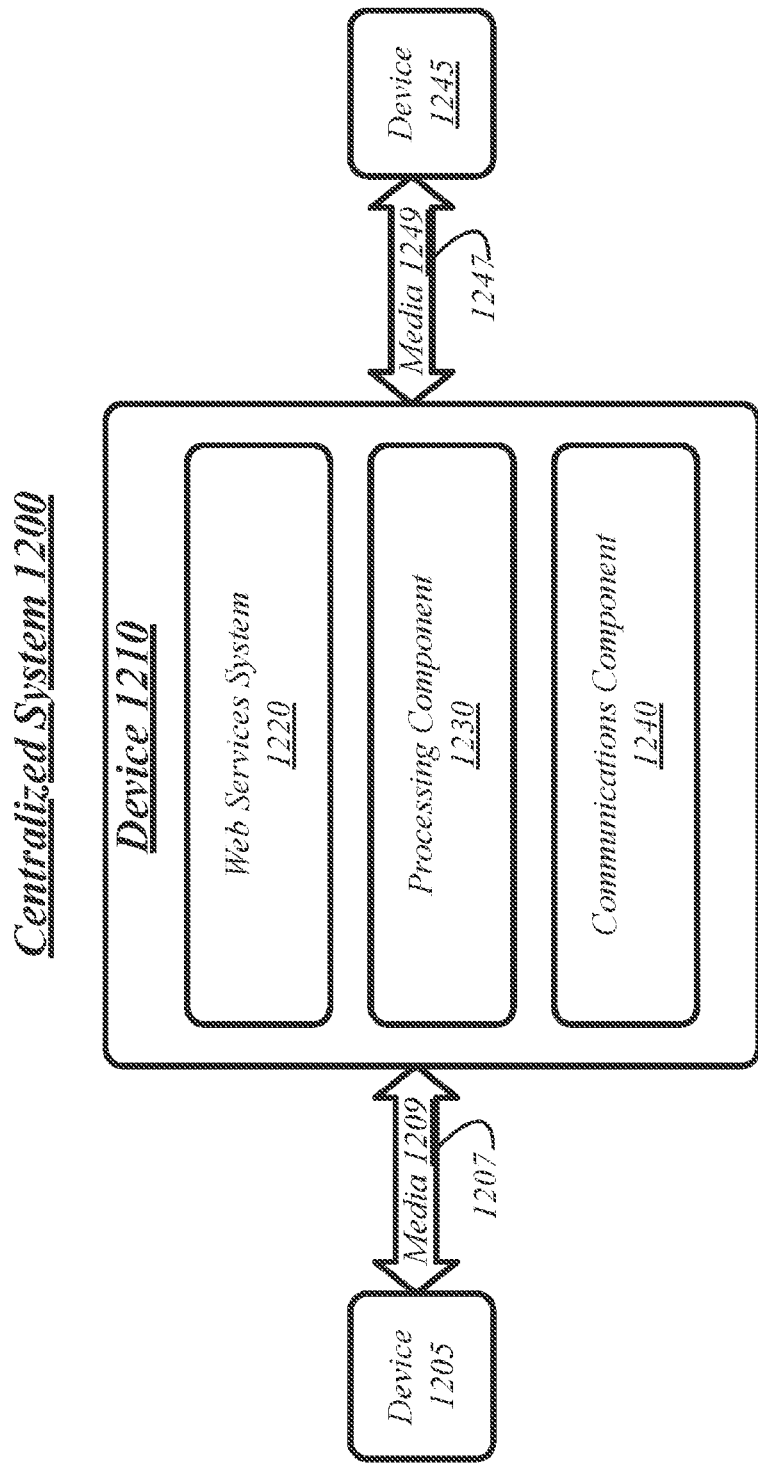
FIG. 12 illustrates an embodiment of a centralized system.

FIG. 12 illustrates a block diagram of a centralized system 1200. The centralized system 1200 may implement some or all of the structure and/or operations for the web services system 1220 in a single computing entity, such as entirely within a single device 1210.

The device 1210 may comprise any electronic device capable of receiving, processing, and sending information for the web services system 1220. Examples of an electronic device may include without limitation a client device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 1210 may execute processing operations or logic for the web services system 1220 using a processing component 1230. The processing component 1230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1210 may execute communications operations or logic for the web services system 1220 using communications component 1240. The communications component 1240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1209, 1249 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1210 may communicate with other devices 1205, 1245 over a communications media 1209, 1249, respectively, using communications signals 1207, 1247, respectively, via the communications component 1240. The devices 1205, 1245, may be internal or external to the device 1210 as desired for a given implementation.

For example, device 1205 may correspond to a client device such as a phone used by a user. Signals 1207 sent over media 1209 may therefore comprise communication between the phone and the web services system 1220 in which the phone transmits a request and receives a web page or other data in response.

Figure 13:
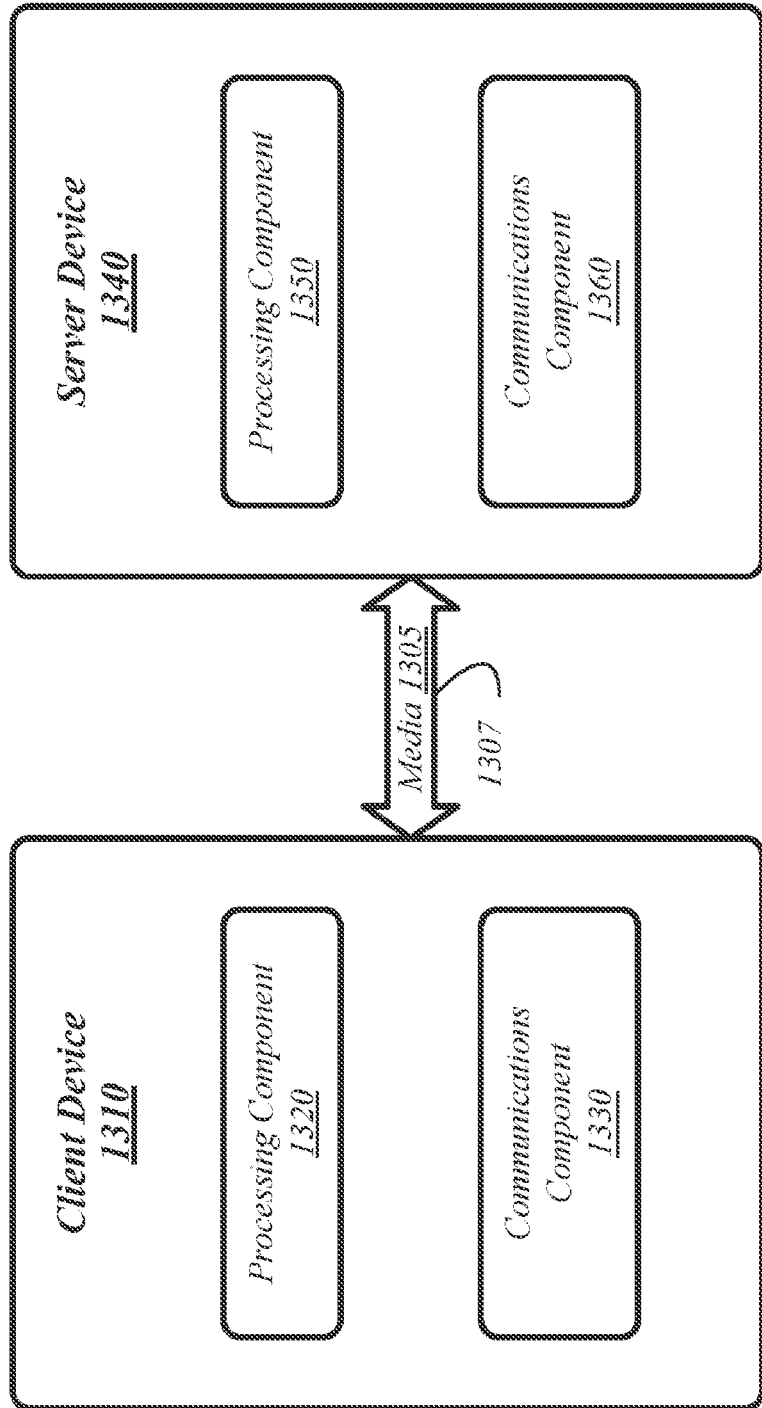
FIG. 13 illustrates an embodiment of a distributed system.

FIG. 13 illustrates a block diagram of a distributed system 1300. The distributed system 1300 may distribute portions of the structure and/or operations for the disclosed embodiments across multiple computing entities. Examples of distributed system 1300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1300 may comprise a client device 1310 and a server device 1340. In general, the client device 1310 and the server device 1340 may be the same or similar to the client device 1210 as described with reference to FIG. 12. For instance, the client system 1310 and the server system 1340 may each comprise a processing component 1320, 1350 and a communications component 1330, 1360 which are the same or similar to the processing component 1230 and the communications component 1240, respectively, as described with reference to FIG. 12. In another example, the devices 1310, 1340 may communicate over a communications media 1305 using communications signals 1307 via the communications components 1330, 1360.

The client device 1310 may comprise or employ one or more client programs that operate to perform various methodologies in accordance with the described embodiments. In one embodiment, for example, the client device 1310 may implement some steps described with respect to FIGS. 8, 9, 10.

The server device 1340 may comprise or employ one or more server programs that operate to perform various methodologies in accordance with the described embodiments. In one embodiment, for example, the server device 1340 may implement some steps described with respect to FIGS. 8, 9, 10.

Figure 14:
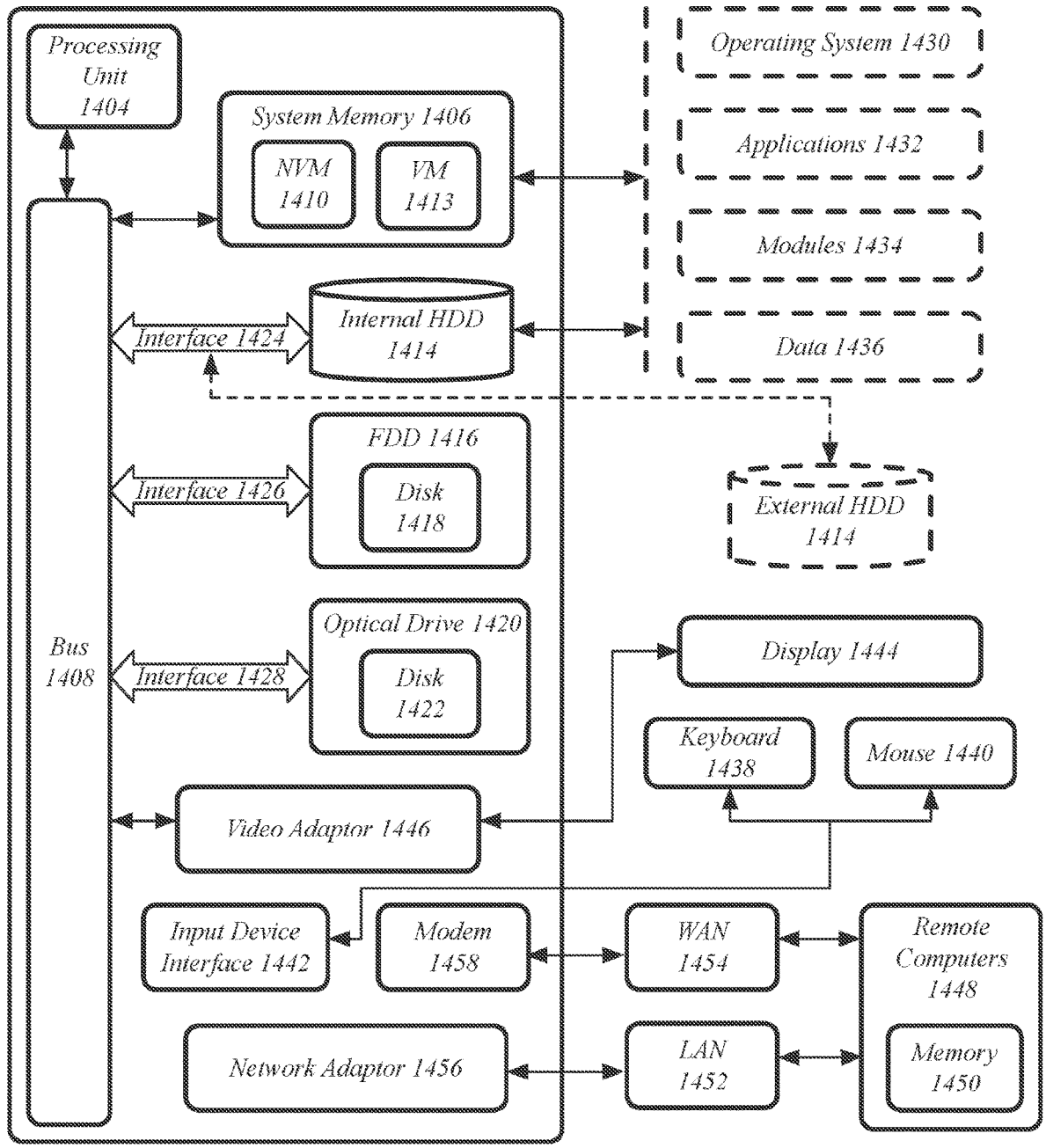
FIG. 14 illustrates an embodiment of a computing architecture.

FIG. 14 illustrates an embodiment of an exemplary computing architecture 1400 suitable for implementing various embodiments as previously described. In one embodiment, the computing architecture 1400 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1404.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1413. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM, DVD, or Blu-ray). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1413, including an operating system 1430, one or more application programs 1432, other program modules 1434, and program data 1436. In one embodiment, the one or more application programs 1432, other program modules 1434, and program data 1436 can include, for example, the various applications and/or components to implement the disclosed embodiments.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A display 1444 is also connected to the system bus 1408 via an interface, such as a video adaptor 1446. The display 1444 may be internal or external to the computer 1402. In addition to the display 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
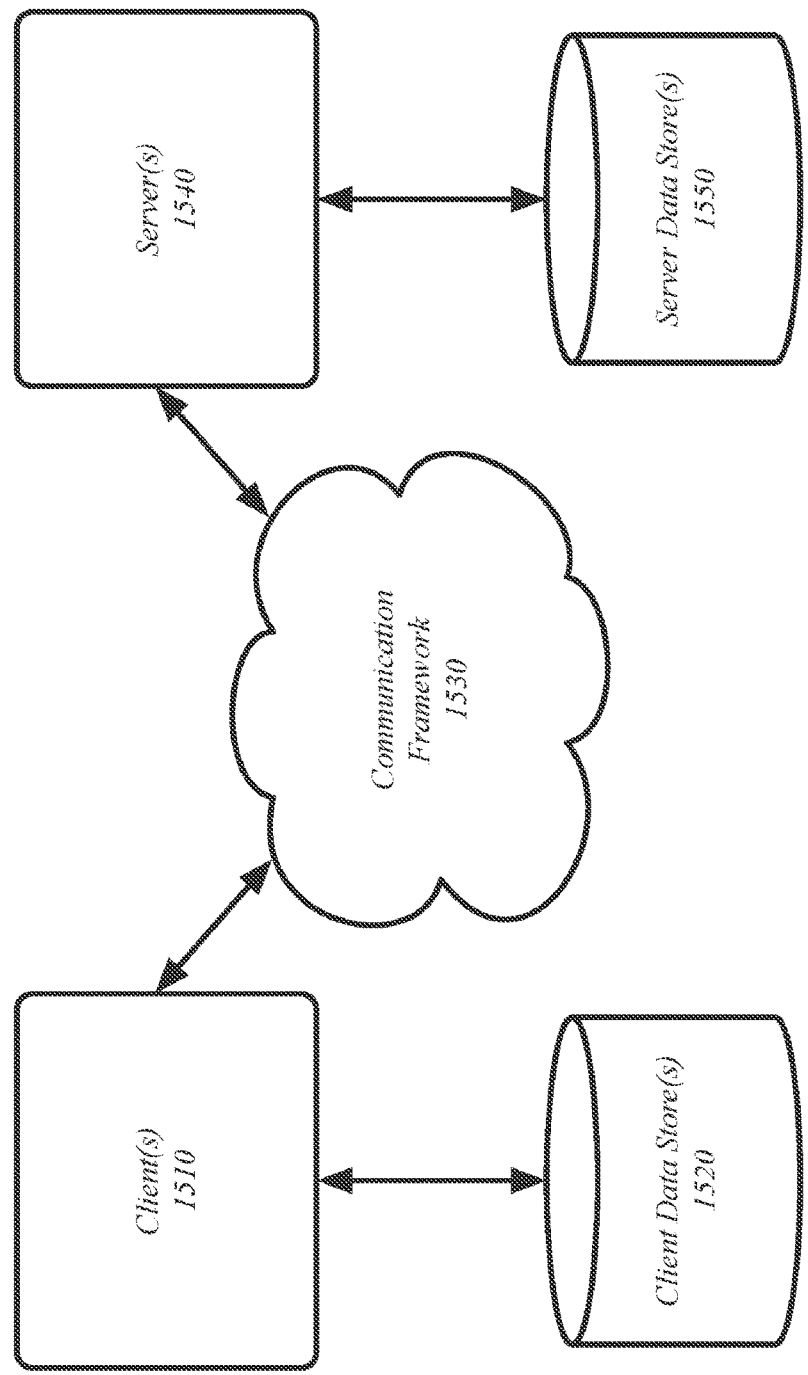
FIG. 15 illustrates an embodiment of a communications architecture

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 comprises includes one or more clients 1510 and servers 1540. The clients 1510 may implement the client device 1510, for example. The servers 1540 may implement the server device 1540, for example. The clients 1510 and the servers 1540 are operatively connected to one or more respective client data stores 1520 and server data stores 1550 that can be employed to store information local to the respective clients 1510 and servers 1540, such as cookies and/or associated contextual information.

The clients 1510 and the servers 1540 may communicate information between each other using a communication framework 1530. The communications framework 1530 may implement any well-known communications techniques and protocols. The communications framework 1530 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1530 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1510 and the servers 1540. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Example 1

A computer-implemented method for sharing private data objects, comprising: provisioning one or more contract enclaves from a plurality of contract enclaves; preparing a contract and initial state for a private data object (PDO); receiving an encrypted and signed PDO and signature from one or more of the provisioned contract enclaves; verifying the received signature; and communicating the PDO and verified signature to a distributed ledger.

Example 2

The computer-implemented method of Example 1, wherein the PDO includes one or more rights managed within a contract manager.

Example 3

The computer-implemented method of Example 2, wherein the contract manager executes exclusively within a provisioned contract enclave.

Example 4

The computer-implemented method of Example 2, wherein the one or more rights includes a limitation on data visibility.

Example 5

The computer-implemented method of Example 1, wherein the distributed ledger is used as a data commit log.

Example 6

The computer-implemented method of Example 5, wherein the distributed ledger is configured to allow, at most, a single authoritative instance of the PDO.

Example 7

The computer-implemented method of Example 1, wherein interactions with the PDO can exclusively be performed within one of the provisioned contract enclaves.

Example 8

The computer-implemented method of Example 1, wherein the PDO includes a non-deterministic smart contract.

Example 9

The computer-implemented method of Example 1, further comprising: requesting the PDO from the distributed ledger; receiving the PDO from the distributed ledger; and sending the PDO to one of the provisioned contract enclaves.

Example 10

The computer-implemented method of Example 9, further comprising: receiving a new iteration of the PDO from the one of the provisioned contract enclaves, one or more signed state transitions, and one or more method parameters; and submitting the new iteration of the PDO from the one of the provisioned contract enclaves, one or more signed state transitions, and one or more method parameters to the distributed ledger.

Example 11

A system for sharing private data objects, comprising: a plurality of contract enclaves; and a client device including one or more processor circuits, the client device configured to: provision one or more contract enclaves from the plurality of contract enclaves; prepare a contract and initial state for a private data object (PDO); receive an encrypted and signed PDO and signature from one or more of the provisioned contract enclaves; verify the received signature; and communicate the PDO and verified signature to a distributed ledger.

Example 12

The system of Example 11, wherein the PDO includes one or more rights managed within a contract manager.

Example 13

The system of Example 12, wherein the contract manager executes exclusively within a provisioned contract enclave.

Example 14

The system of Example 12, wherein the one more rights includes a limitation on data visibility.

Example 15

The system of Example 11, wherein the distributed ledger is used as a data commit log.

Example 16

The system of Example 15, wherein the distributed ledger is configured to allow, at most, a single authoritative instance of the PDO.

Example 17

The system of Example 11, wherein interactions with the PDO can exclusively be performed within one of the provisioned contract enclaves.

Example 18

The system of Example 11, wherein the PDO includes a non-deterministic smart contract.

Example 19

The system of Example 11, the client device configured to: request the PDO from the distributed ledger; receive the PDO from the distributed ledger; and send the PDO to one of the provisioned contract enclaves.

Example 20

The system of Example 19, the client device configured to: receive a new iteration of the PDO from the one of the provisioned contract enclaves, one or more signed state transitions, and one or more method parameters; and submit the new iteration of the PDO from the one of the provisioned contract enclaves, one or more signed state transitions, and one or more method parameters to the distributed ledger.

Example 21

An article comprising a non-transitory computer-readable storage medium that stores instructions for execution by processing circuitry of a client device, the instructions to cause the client device to: provision one or more contract enclaves from a plurality of contract enclaves; prepare a contract and initial state for a private data object (PDO); receive an encrypted and signed PDO and signature from one or more of the provisioned contract enclaves; verify the received signature; and communicate the PDO and verified signature to a distributed ledger.

Example 22

The article of Example 21, wherein the PDO includes one or more rights managed within a contract manager.

Example 23

The article of Example 22, wherein the contract manager executes exclusively within a provisioned contract enclave.

Example 24

The article of Example 22, wherein the one more rights includes a limitation on data visibility.

Example 25

The article of Example 21, wherein the distributed ledger is used as a data commit log.

Example 26

The article of Example 25, wherein the distributed ledger is configured to allow, at most, a single authoritative instance of the PDO.

Example 27

The article of Example 21, wherein interactions with the PDO can exclusively be performed within one of the provisioned contract enclaves.

Example 28

The article of Example 21, wherein the PDO includes a non-deterministic smart contract.

Example 29

The article of Example 21, further comprising instructions to cause the client device to: request the PDO from the distributed ledger; receive the PDO from the distributed ledger; and send the PDO to one of the provisioned contract enclaves.

Example 30

The article of Example 29, further comprising instructions to cause the client device to: receive a new iteration of the PDO from the one of the provisioned contract enclaves, one or more signed state transitions, and one or more method parameters; and submit the new iteration of the PDO from the one of the provisioned contract enclaves, one or more signed state transitions, and one or more method parameters to the distributed ledger.

Example 31

An apparatus, comprising: at least one memory; at least one processor; and logic, at least a portion of the logic comprised in hardware and executed by the at least one processor, the logic to: provision one or more contract enclaves from a plurality of contract enclaves; prepare a contract and initial state for a private data object (PDO); receive an encrypted and signed PDO and signature from one or more of the provisioned contract enclaves; verify the received signature; and communicate the PDO and verified signature to a distributed ledger.

Example 32

The apparatus of Example 31, wherein the PDO includes one or more rights managed within a contract manager.

Example 33

The apparatus of Example 32, wherein the contract manager executes exclusively within a provisioned contract enclave.

Example 34

The apparatus of Example 32, wherein the one more rights includes a limitation on data visibility.

Example 35

The apparatus of Example 31, wherein the distributed ledger is used as a data commit log.

Example 36

The apparatus of Example 35, wherein the distributed ledger is configured to allow, at most, a single authoritative instance of the PDO.

Example 37

The apparatus of Example 31, wherein interactions with the PDO can exclusively be performed within one of the provisioned contract enclaves.

Example 38

The apparatus of Example 31, wherein the PDO includes a non-deterministic smart contract.

Example 39

The apparatus of Example 31, further comprising logic to: request the PDO from the distributed ledger; receive the PDO from the distributed ledger; and send the PDO to one of the provisioned contract enclaves.

Example 40

The apparatus of Example 39, further comprising logic to: receive a new iteration of the PDO from the one of the provisioned contract enclaves, one or more signed state transitions, and one or more method parameters; and submit the new iteration of the PDO from the one of the provisioned contract enclaves, one or more signed state transitions, and one or more method parameters to the distributed ledger.

Example 41

An apparatus for sharing private data objects, comprising: means for provisioning one or more contract enclaves from a plurality of contract enclaves; means for preparing a contract and initial state for a private data object (PDO); means for receiving an encrypted and signed PDO and signature from one or more of the provisioned contract enclaves; means for verifying the received signature; and means for communicating the PDO and verified signature to a distributed ledger.

Example 42

The apparatus of Example 41, wherein the PDO includes one or more rights managed within a contract manager.

Example 43

The apparatus of Example 42, wherein the contract manager executes exclusively within a provisioned contract enclave.

Example 44

The apparatus of Example 42, wherein the one more rights includes a limitation on data visibility.

Example 45

The apparatus of Example 41, wherein the distributed ledger is used as a data commit log.

Example 46

The apparatus of Example 45, wherein the distributed ledger is configured to allow, at most, a single authoritative instance of the PDO.

Example 47

The apparatus of Example 41, wherein interactions with the PDO can exclusively be performed within one of the provisioned contract enclaves.

Example 48

The apparatus of Example 41, wherein the PDO includes a non-deterministic smart contract.

Example 49

The apparatus of Example 41, further comprising: means for requesting the PDO from the distributed ledger; means for receiving the PDO from the distributed ledger; and means for sending the PDO to one of the provisioned contract enclaves.

Example 50

The apparatus of claim 49, further comprising: means for receiving a new iteration of the PDO from the one of the provisioned contract enclaves, one or more signed state transitions, and one or more method parameters; and means for submitting the new iteration of the PDO from the one of the provisioned contract enclaves, one or more signed state transitions, and one or more method parameters to the distributed ledger.

The invention claimed is:

1. A computer-implemented method for sharing private data objects, comprising:
    requesting a private data object (PDO) from a distributed ledger;
    receiving the PDO from the distributed ledger;
    selecting a contract enclave configured to interact with the PDO; and
    submitting the PDO to the contract enclave.

2. The computer-implemented method of claim 1, comprising:
    submitting a method invocation to the contract enclave;
    receiving, from the contract enclave, a new iteration of the PDO, one or more signed state transitions, and one or more method parameters; and
    submitting, to the distributed ledger, the new iteration of the PDO, the one or more signed state transitions, and the one or more method parameters.

3. The computer-implemented method of claim 1, comprising provisioning the contract enclave.

4. The computer-implemented method of claim 1, wherein the PDO includes one or more rights managed within a contract manager.

5. The computer-implemented method of claim 4, wherein the contract manager executes exclusively within the contract enclave.

6. The computer-implemented method of claim 4, wherein the one or more rights includes a limitation on data visibility.

7. The computer-implemented method of claim 1, wherein the distributed ledger is used as a data commit log and is configured to allow, at most, a single authoritative instance of the PDO.

8. The computer-implemented method of claim 1, wherein the PDO includes a non-deterministic smart contract.

9. An apparatus for sharing private data objects, comprising:
    memory comprising instructions; and
    circuitry coupled to the memory, wherein the instructions when executed by the circuitry cause the circuitry to:
        request a private data object (PDO) from a distributed ledger;
        receive the PDO from the distributed ledger;
        select a contract enclave configured to interact with the PDO; and
        submit the PDO to the contract enclave.

10. The apparatus of claim 9, wherein the instructions when executed by the circuitry further cause the circuitry to:
    submit a method invocation to the contract enclave;
    receive, from the contract enclave, a new iteration of the PDO, one or more signed state transitions, and one or more method parameters; and
    submit, to the distributed ledger, the new iteration of the PDO, the one or more signed state transitions, and the one or more method parameters.

11. The apparatus of claim 9, wherein the instructions when executed by the circuitry further cause the circuitry to provision the contract enclave.

12. The apparatus of claim 9, wherein the PDO includes one or more rights managed within a contract manager.

13. The apparatus of claim 12, wherein the contract manager executes exclusively within the contract enclave.

14. The apparatus of claim 12, wherein the one or more rights includes a limitation on data visibility.

15. The apparatus of claim 9, wherein the distributed ledger is used as a data commit log and is configured to allow, at most, a single authoritative instance of the PDO.

16. The apparatus of claim 9, wherein the PDO includes a non-deterministic smart contract.

17. At least one non-transitory computer-readable storage medium that stores instructions for execution by processing circuitry of a client device, the instructions to cause the client device to:

request a private data object (PDO) from a distributed ledger;

receive the PDO from the distributed ledger;

select a contract enclave configured to interact with the PDO; and submit the PDO to the contract enclave.

18. The at least one non-transitory computer-readable storage medium of claim 17, further comprising instructions to cause the client device to:

submit a method invocation to the contract enclave;

receive, from the contract enclave, a new iteration of the PDO, one or more signed state transitions, and one or more method parameters; and submit, to the distributed ledger, the new iteration of the PDO, the one or more signed state transitions, and the one or more method parameters.

19. The at least one non-transitory computer-readable storage medium of claim 17, further comprising instructions to cause the client device to provision the contract enclave.

20. The at least one non-transitory computer-readable storage medium of claim 17, wherein the PDO includes one or more rights managed within a contract manager.

21. The at least one non-transitory computer-readable storage medium of claim 20, wherein the contract manager executes exclusively within the contract enclave.

22. The at least one non-transitory computer-readable storage medium of claim 20, wherein the one or more rights includes a limitation on data visibility.

23. The at least one non-transitory computer-readable storage medium of claim 17, wherein the distributed ledger is used as a data commit log and is configured to allow, at most, a single authoritative instance of the PDO.

24. The at least one non-transitory computer-readable storage medium of claim 17, wherein the PDO includes a non-deterministic smart contract.

\* \* \* \* \*